UNITED STATES PATENT OFFICE.

ANSIL MOFFATT, OF INDIANAPOLIS, INDIANA.

PROCESS OF MAKING PIGMENTS.

990,156. Specification of Letters Patent. Patented Apr. 18, 1911.

No Drawing. Application filed September 15, 1910. Serial No. 582,147.

*To all whom it may concern:*

Be it known that I, ANSIL MOFFATT, a citizen of the United States, residing at the city of Indianapolis, in the county of Marion and State of Indiana, have invented certain new and useful Improvements in Processes of Making Pigments, of which the following is a specification.

This invention relates to a process for the production of an improved pigment, and pertains particularly to a process which results in a refined and superior quality of barium sulfate.

The principal object of my invention is to produce an extremely finely subdivided barium sulfate in large quantities and in a very pure state directly from the natural mineral barium sulfate.

It is a further object to reduce barium sulfate as above stated by a process of fusion with a salt which is commercially abundant.

It has long been a well known, but heretofore an impracticable, fact that barium sulfate, when brought into a condition of extremely fine subdivision, may then be cleared from all impurities, as it is the finest imaginable powder, and is not affected by any known acid. It is also well known to those familiar with the art that two classes of pigments, produced by two inadequate and unsatisfactory methods are now derived from natural barium sulfate, otherwise known as "barite", "barytes", "heavy spar", or "tiff". The first method is that which results in what is commercially known as "floated" or "triple floated" barytes, and consists in mechanically pulverizing to as small a subdivision as possible the natural product, and then either sifting or floating in water to collect the finest subdivisions of the powder, after which the latter is bleached and dried and sold in this state. However, the floated barytes thus produced, while possessing a sufficient degree of whiteness, has comparatively no covering power or "body", and is regarded generally as an adulteration.

The second commercially used process consists in converting the natural mineral into barium sulfid by heating it with coal or other reducing material, then purifying and precipitating it in solution by some sulfate, generally sodium sulfate. The white precipitate resulting therefrom is barium sulfate (chemically the same as the original barytes) and this precipitate is purified by washing with water. When purified, and separated partly or entirely from the water, for packing in either the wet or dry form as desired, the result is the "blanc fixe" of well known commercial standard. The latter, while being the best barytes pigment on the market, is nevertheless unsatisfactory both as to its covering ability or opacity, and as to its expense of production.

Generally speaking, my process of treatment consists in fusing or melting sodium chlorid, or any other suitable alkaline chlorid with barium sulfate, until the latter enters into a complete state of solution or alloy with said chlorid and thereby becomes extremely finely subdivided. When the fused or melted mixture is cooled the alkaline chlorid, being a soluble salt, may be dissolved away from the barium sulfate, which latter, being insoluble, will remain behind in a state of extreme subdivision, to be prepared for commerce in any form, as requirements dictate.

In the foregoing paragraph, and in the succeeding parts of my specification, I refer to the barium sulfate as being "extremely finely subdivided". This is a term which I use to indicate the extreme subdivision of the barium sulfate which I succeed in producing by my process, to distinguish it from the ordinary powdered barium sulfate heretofore produced by other methods. The principal evidence of this extreme subdivision is found in the adequate and thorough covering power and complete opacity of my product when used as a paint pigment.

My preferred method of treating barium sulfate is as follows: I take the natural form of barium sulfate (variously known under the names of barite, barytes, heavy spar or tiff) and mix it suitably with sodium chlorid, this being both an economical and efficient solvent for barium sulfate and having a low fusing or melting point. The temperature or point of fusion of the mixture will be high or low according to the proportion of sodium chlorid in the mixture, and the proportion of sodium chlorid is of such quantity that the two salts will be in molecular proportion, or the sodium chlorid may be in excess, so that the fused or melted alloy will become homogeneous at an early period. The mixture of barium sulfate and sodium chlorid is heated in an appropriate vessel until fusion occurs, and is maintained in a state of fusion until the alloy or solution is homogeneous or complete. Upon reaching this complete state of alloy, the fused mixture is withdrawn and suitably cooled. The cooling process may be carried on either by pouring the mixture out to cool, or by pouring it into water in a gradual stream. Whichever method is used, the congealed product is then boiled in water to dissolve the alkaline chlorid, and to precipitate the barium sulfate. The precipitate of barium sulfate thus remaining, by reason of its insolubility in water, is the extremely finely subdivided product sought for by my process. As a final step in its production, it is suitably treated by a process of washing and bleaching if desired. It is washed in a water bath, to remove any impurities of a solid nature which may remain, and may be treated with small quantities of acid to remove any coloring impurities. The purified barium sulfate may be drained and dried and suitably packed. In the process of precipitation, it is possible to combine therewith the cooling step, by slowly introducing the hot alloy in fused state into the water in a slow manner, thus causing the alloy to be prepared for the boiling and separating process in the same vessel or apparatus in which it is cooled.

The result produced by the process above set forth is a pigment of superior quality, especially suitable for use as a paint pigment. Extended experiment has disclosed the fact that a perfect pigment, chemically produced and molecularly subdivided in an exceptionally high degree, may be supplied to enter commerce at a cost approximating $20.00 per ton. This product is derived from the mineral or natural barytes or "tiff", and is the result entirely of the process hereinbefore described. Its cost of production is small, by reason of the comparative simplicity, and ease of installation, of the apparatus necessary, and by reason of the general commercial quantities in which the necessary solvent can be obtained.

I claim:

1. A process of producing barium sulfate in a state of extremely fine subdivision which consists in fusing natural barium sulfate with an alkaline chlorid and precipitating the barium sulfate from the alkaline chlorid.

2. A process of producing barium sulfate in an extremely fine state of subdivision which consists in fusing natural barium sulfate with an alkaline chlorid, cooling the fused mass, and dissolving the alkaline chlorid from the barium sulfate in water.

3. A process of producing barium sulfate in a state of extremely fine subdivision which consists in fusing natural barium sulfate with sodium chlorid and dissolving the sodium chlorid from the barium sulfate in water.

In testimony whereof I have hereunto affixed my signature in the presence of two witnesses.

ANSIL MOFFATT.

Witnesses:
  WM. T. HENLEY,
  EDWARD G. GATES.